United States Patent

Schwering et al.

[11] Patent Number: 5,460,724
[45] Date of Patent: * Oct. 24, 1995

[54] APPARATUS AND METHOD FOR THE REGENERATION OF AN ION EXCHANGER INSTALLATION

[75] Inventors: Hans-Ulrich Schwering, Leonberg; Roland Schaich, Leutenbach, both of Germany

[73] Assignee: Guetling GmbH, Fellbach, Germany

[*] Notice: The portion of the term of this patent subsequent to Jan. 17, 2012 has been disclaimed.

[21] Appl. No.: 146,953

[22] Filed: Nov. 3, 1993

[30] Foreign Application Priority Data

Nov. 26, 1992 [DE] Germany .............................. 9216084 U
Nov. 27, 1992 [DE] Germany .............................. 9216153 U
Feb. 13, 1993 [DE] Germany .......................... 43 04 411.5

[51] Int. Cl.$^6$ ........................................................ C02F 1/42
[52] U.S. Cl. ........................ 210/662; 210/678; 210/108; 210/190
[58] Field of Search .................................. 210/662, 670, 210/678, 98, 108, 269, 277, 190, 675

[56] References Cited

U.S. PATENT DOCUMENTS

| | | | |
|---|---|---|---|
| 3,396,845 | 8/1968 | Bouskill | 210/98 |
| 3,638,794 | 2/1972 | Holzer | 210/98 |
| 3,676,336 | 7/1972 | O'Brien et al. | 210/96 |
| 3,960,721 | 6/1976 | Heskett | 210/190 |
| 4,104,158 | 8/1978 | Davis | 210/139 |
| 4,666,856 | 5/1987 | Irgum et al. | 436/122 |
| 4,897,797 | 1/1990 | Free, Jr. et al. | 364/500 |
| 4,954,265 | 9/1990 | Greenberg et al. | 210/710 |
| 5,027,661 | 7/1991 | Desaulniers et al. | 73/861 |
| 5,069,779 | 12/1991 | Brown et al. | 210/87 |
| 5,108,616 | 4/1992 | Kunz | 210/678 |

FOREIGN PATENT DOCUMENTS

| | | |
|---|---|---|
| 0073940 | 3/1983 | European Pat. Off. . |
| 1442492 | 10/1968 | Germany . |
| 1517375 | 5/1969 | Germany . |
| 1902664 | 8/1970 | Germany . |
| 2033200 | 1/1972 | Germany . |
| 2603601 | 8/1977 | Germany . |
| 2819231 | 11/1978 | Germany . |
| 3046665 | 7/1982 | Germany . |
| 3402912 | 3/1985 | Germany . |
| 3821036A1 | 12/1989 | Germany . |
| 549593 | 3/1977 | U.S.S.R. . |

*Primary Examiner*—Cynthia L. Nessler
*Attorney, Agent, or Firm*—Flynn, Thiel, Boutell & Tanis

[57] ABSTRACT

In a regenerating ion exchanger installation with a resin container, the water, acid and/or alkaline solution pipe conduits inlets lead into a common pump inlet conduit, whereby each inlet can be individually decoupled from the inlet conduit of the pump by means of a specially controllable cut-off valve. The pump is a compressed air-diaphragm pump and feeds directly into a fluid conduit ending at either the upper or the lower side of the resin container and exhibits a counting device for stroke counting, whereby a control device is provided connected to the counting device for the control of the volume flow of water out of the water inlet and acid or alkaline solution out of the acid or alkaline solution inlet via the controllable cut-off valves based on the corresponding stroke count of the compressed air-diaphragm pump. In this fashion a precise admeasurement and mixing of the regenerating agent solution introduced into the resin container can be realized and no special safety devices are needed for the pump.

23 Claims, 2 Drawing Sheets

APPARATUS AND METHOD FOR THE REGENERATION OF AN ION EXCHANGER INSTALLATION

BACKGROUND OF THE INVENTION

An ion exchanger installation has a resin container which is at least partially filled with ion exchanger resin in the form of small resin particles and which exhibits on each of its upper and lower sides at least one liquid conduit emptying into an input or output opening for the addition or drainage of liquids into and out of the resin container, with a water inlet and an acid and/or alkaline inlet to the resin container, with the inlets each exhibiting pipe conduits with cut-off valves, and with a pump for the transport of the liquids.

Such an ion exchanger installation is, for example, known from U.S. Pat. No. 5,108,616 or DE-OS 38 21 036.

In the known ion exchanger installations a fluid charged with unwanted ions, usually salt or lime-containing water, is guided in the operation phase, through the resin container either in the upstream or in the downstream direction and the unwanted ions which are in solution in the liquid are exchanged on the surface of the resin particles with other ions from the ion exchanger resin. When the majority of the exchange ions on the surface of the resin particles are exchanged with the unwanted ions the ion exchanger process becomes ineffective since a noticeable fraction of the unwanted ions remains dissolved in the fluid after the fluid is being treated is passed through the resin container. Therefore after a certain time, or after the passage of a particular volume of fluid which is to be handled through the resin container, the ion exchanger resin is exhausted and must be regenerated. The regeneration agent is effected by introducing a liquid regeneration agent through the ion exchange resin, which for its part, exchanges the unwanted ions, which are bound to the resin particles, with the exchange ions. In the case of a cation exchanger the liquid regenerating agent usually comprises diluted acid, and with an anion exchanger, diluted alkaline solution. In a selective exchanger the ion exchanger resin is initially regenerated with diluted acid and subsequently conditioned with diluted alkaline solution.

In order to, on the one hand, guarantee as complete a regeneration of the exhausted ion exchanger resin as possible while, on the other hand, not wasting the fluid regeneration agent, in known ion exchange installations the liquid regeneration agent is more or less precisely measured, before its introduction into the resin container, with respect to both its degree of dilution with water as well as with respect to its volume amount. Towards this end a plurality of differing methods and apparatuses are known.

In the so-called preparation method a precisely defined volume amount of water and a likewise precisely defined volume amount of concentrated acid or alkaline solution are admeasured in a preparation vessel. Subsequently the fluid is pumped out of the preparation vessel by means of a transport pump and, by means of a return conduit, fed back in again. This circulating pumping procedure is carried out over a certain period of time whereby the concentrated acid or alkaline solution becomes well mixed with the water so that the prepared regenerating agent solution is homogenized in the preparation vessel. Subsequent thereto a defined volume amount of the thereby prepared regeneration agent solution is first transported out of the preparation vessel and into the resin container. Instead of the circulating pumping device a stirring mechanism for the mixing and homogenization of the regeneration agent solution can be provided for. Although, in any event, the preparation method is particularly precise with regard to both the volume amount of liquid regenerating agent introduced into the resin container as well as to its consistency, the required apparative expenditure is significant and the process itself is time consuming and consequently, in general, relatively expensive.

In another method known in the art, the so-called dosage method, a particular volume amount of concentrated acid or alkaline solution is pumped, with the assistance of a dosage pump, out of a relatively small preparation vessel in a time controlled or fill-level controlled fashion and introduced into a stream of water with which the acid or alkaline solution is diluted into liquid regenerating agent which is then introduced into the resin container. Since, with this dosage method, the recirculating pumping device or the mixing mechanism are eliminated the accompanying apparatus is less expensive than that for the preparation method. However, the liquid regenerating agent which is introduced into the resin container can exhibit homogeneity fluctuations as well as, due to time variations in water pressure, variations in the volume amount introduced.

A further disadvantage of the known installation results from the necessity of installing particular safety mechanisms for the mechanical positive displacement pump normally utilized as the dosage pump. Since concentrated acid and alkaline solution are transported with this pump, the system must in any event prevent spill-off of fluids in case of a malfunction. For example, in the event of compressed air failure, conduit blockage due to dirt, or improper adjustment of valves in the conduit system it is necessary to safeguard the transport pump against overheating and a possible leaking which could thereby result or against unacceptable overpressuring which could lead to a rupturing of conduits. These types of safeguarding devices require, however, additional investment and since failures might always occur in the security system, an absolute safeguarding of the installation is impossible.

In contrast, an apparatus which works according to the so-called suction-injector-method is more economical. Here concentrated acid or alkaline solution is introduced, in a time or fill-level controlled fashion, out of a preparation vessel to an ejector constructed in the manner of a Venturi-nozzle through which water, at a particular conduit pressure, is pumped. Since, due to the dynamic partial pressure produced by the ejector, the water carries along with it the concentrated acid or alkaline solution, a dosage pump for the transport of the acid or alkaline solution is not necessary in this known apparatus. The apparatus is therefore more economical than the dosage method apparatus, however, the liquid regenerating agent which is produced in this fashion, is subject to even larger volume and/or density variations which are dependent on the water pressure.

It is therefore the purpose of the present invention to present an apparatus and a method for the regeneration of an ion exchanger installation of the above mentioned kind with which, using simplified apparatus means, a precise dosing and blending of the liquid regeneration agent which is to be introduced into the resin container is nevertheless guaranteed and no special safeguarding devices for the transport pumps are necessary.

SUMMARY OF THE INVENTION

This purpose is achieved in accordance with the invention in that the pipe conduits for the introduction of fresh water, acid and/or alkaline solution feed into a common pump inlet whereby each inlet can be separately decoupled from the pump inlet by means of a controllable cut-off valve, in that the pump feeds directly into a fluid conduit feeding directly either into the upper or into the lower side of the resin container, in that the pump is a compressed air-diaphragm pump and exhibits a counting device for stroke counting and in that a control device connected to the counting device is provided for to control the volume stream of water from the water inlet and acid or alkaline solution from the acid or alkaline inlets by means of controllable cut-off valves based on the corresponding stroke count of the compressed air-diaphragm pump.

Instead of the admeasuring method according to prior art described above, the dosing of the liquid regenerating agent now takes place in the ion exchanger installation in accordance with the invention based on the number of strokes of the compressed air-diaphragm pump which is proportional to a certain transported volume amount. Thereby the admeasuring problem is solved in a surprisingly elegant and economical fashion whereby the precision of the dosing is competitive with that of the above described preparation method. Since, in all known installations, at least one pump must be utilized to transport liquid the regenerating agent, all the other additional steps and apparative components described above which serve for dosing and mixing the regenerating agent solution, are eliminated in the apparatus in accordance with the invention. With the assistance of the compressed air-diaphragm pump it is possible in the ion exchange installation in accordance with the invention, for the purpose of regenerating the ion exchanger resin, to alternately pump concentrated acid or alkaline solution and water into the resin container, whereby a mixing of the acid or alkaline solution with the water already takes place in the common inlet conduit to the pump, in the liquid conduits feeding into the resin container, as well as in the inlet region of the liquid conduits in the resin container.

In the event of a malfunction during the regeneration phase the ion exchanger installation according to the invention, with its compressed air-diaphragm pump, stops in an operation position which safeguards the system since the compressed air-diaphragm pump, in contrast to a positive-displacement pump with mechanical drive, neither overhears nor is capable of producing an unallowable overpressure in the conduit system which could lead to the rupturing of conduits. In the event of a possible malfunction the compressed air-diaphragm pump simply stops.

In a preferred embodiment of the inventive ion exchanger installation, a mixing zone for the mixing and homogenization of the introduced fluids is provided for in the resin container in the vicinity of the lower and/or upper side between the inlet opening of the fluid conduit for the introduction of acid and/or alkaline solution into the resin container and the ion exchanger resin. Thereby it is possible to assure that only optimally homogenized liquid regenerating agent reaches the ion exchanger resin, so that the precision with which the regeneration procedure is exercised is again significantly increased.

In a preferred embodiment the inventive ion exchanger installation is operational in a down stream counter-current flow mode. In another embodiment the ion exchanger installation can be operated in a down stream co-current flow mode.

In a special improvement of these two embodiments a plate baffle is provided for in the resin container in the vicinity of the upper side and a lower nozzle floor on the lower side, whereby the ion exchanger resin is arranged in the volume region between the plate baffle and the lower nozzle floor and a lower dead space remains between the lower nozzle floor and the underside of the resin container. The plate baffle which is per se known in the art reduces the transfer of the linear momentum of the liquid stream introduced from above during the operational phase into the resin container onto the resin bed. In this manner the resin particles are prevented from being directly hit by a high pressure liquid stream to be dislodged sidewards or upwards. The lower nozzle floor prevents a washing away of the ion exchanger resin out of the resin container. Finally in a down stream counter-current flow operational ion exchanger installation a still better mixing of the liquid regenerating agent introduced in counter current flow into the resin container in the upward direction from below is achieved through the provision of a lower dead space.

In a further particularly preferred embodiment the inventive ion exchanger installation operated in the down stream counter current flow mode can be improved in that the mixing zone comprises the lower dead space, the lower nozzle floor, as well as a layer of preferentially coarse grained filter gravel with in particular a particle diameter between 2 mm and 5 mm which is arranged thereon. A mixing zone of this kind can be manufactured without extensive financial and apparative effort and optimally satisfies the requirements of a static mixer.

Alternative thereto it is possible in a simpler embodiment, in particular when the resin container is a plastic tank, to configure the mixing zone with a fan-out nozzle, provided in the vicinity of the lower side of the resin container, as well as with a layer of preferentially coarse grained filter gravel between the bottom of the resin container up to the upper side of the fan-out nozzle.

In a further embodiment the ion exchanger installation is operational in the upstream counter-current flow mode. Such an ion exchange installation according to the invention can be so configured that, in the resin container, an upper nozzle floor is provided for in the region of the upper side and a lower nozzle floor is provided for in the region of the upper side and a lower nozzle floor is provided for in the vicinity of the lower side, whereby the ion exchanger resin is arranged in the volume region between the lower and the upper nozzle floors and an upper dead space remains between the upper nozzle floor and the upper side of the resin container and a lower dead space remains between the lower nozzle floor and the lower side of the resin container. Due to the lower dead space the lower nozzle floor serves the function of a protective baffle in the down stream counter-current flow mode and prevents a disruption of the resin bed when introducing, from below into the resin container, the fluid to be treated. The upper nozzle floor then functions during counter-current flow regeneration from above towards below, together with the upper dead space as described above as a mixing zone for the homogenization of the liquid regenerating agent.

In a particularly preferred improvement the mixing zone is constructed from the upper nozzle floor as well as from a cover layer arranged between the upper nozzle floor and the ion exchanger resin, the cover layer being made from inert material in the form of small particles with lower specific gravity than the resin particles, in particular also lower than those built-up with water. During regeneration from above towards below in the upstream counter-current flow mode, the light cover layer particles float on the largely water-containing liquid located in the resin container and are set into swirling rotation by the liquid regenerating agent penetrating from the upper nozzle floor downwards so that they cause a very effective mixing and homogenization of the liquid regenerating agent.

In an embodiment of the ion exchanger installation according to the invention at least two compressed air conduits are provided for having air of differing pressures, whereby the compressed air-diaphragm pump can be alternatively driven with compressed air out of one of the compressed air conduits. It is thereby possible to operate, in a simple and economical fashion, the transport pump at different speeds which can be advantageous at differing points of the operational cycle of the installation. Although a conventional mechanical positive-displacement pump can also be operated with differing speeds, an appreciably greater expenditure of effort for the pump electrical or electrical mechanical control system is, however, usually necessary.

In an advantageous improvement of this embodiment a compressed air valve is provided for in each compressed air conduit and the compressed air conduits terminate after the compressed air valves and before the compressed air-diaphragm pump in a common compressed air diaphragm pump air inlet conduit. Thereby a simple possibility for switching the compressed air inlet of the pump from one compressed air conduit to another results.

This advantage is utilized in a particularly preferred improvement in that the compressed air valves are controllable by the control device based on the current stroke count of the compressed air-diaphragm pump. In this fashion the switching of the stroke speed of the compressed air-diaphragm pump can transpire automatically.

In a further preferred embodiment the counting device for stroke counting includes a preferentially electronic counting mechanism with at least four, preferentially at least eight stored discreet stroke values.

A method of operating an ion exchanger installation of the above mentioned kind is also within the framework of the invention with which, in order to regenerate the ion exchanger resin, water and concentrated acid or alkaline solution are alternately transported into the resin container a plurality of times, whereby the volume of the introduced fluids is apportioned via the stroke count of the compressed air-diaphragm pump and whereby a dilution of the introduced acid or alkaline solution to a concentration applicable for regeneration first takes place in the resin container through mixing with the alternately introduced water.

A particularly advantageous variation of this method for the operation of an ion exchanger installation according to the invention having a mixing zone is one in which the mixing of acid or alkaline solution with water takes place essentially in the mixing zone before the regenerating liquid formed from acid or alkaline solution and water reaches the ion exchanger resin. In this fashion a particularly good homogenization of the regeneration liquid and thereby an especially constant and better defined regeneration procedure is achieved.

During the mixing of water with concentrated acid or alkaline solution (for example sulphuric acid or lye), the liquid regenerating agent can become relatively hot. The heat generated by mixing can however, only be exhausted via the container walls of the resin container because otherwise there is the danger of thermally destroying the ion exchanger resin. In a particularly preferred variation of the method the multiple alternate introduction of water and acid or alkaline solution into the resin container takes place in rapid time variation, preferentially in short time intervals with durations of less than several seconds. In this fashion the component fluids of the regenerating liquid are already mixed in the lower or upper dead space of the column so that a release of mixing heat to the container walls is guaranteed. With appropriate addition of water the mixture is increasingly cooled down before it then finally reaches the resin bed at non-critical temperatures.

In an additional variation of the method the introduced fluids are transported with differing speeds due to differing stroke counts per unit time of the compressed air-diaphragm pump, in particular, the concentrated acid or alkaline solution with reduced speed and, in contrast, the water at higher speed. In this fashion the precision of the volume admeasurement and also, in particular, the constitution of the liquid regenerating agent can be increased. A further possibility is to carry out the regeneration step with reduced speeds and a possible subsequent rinsing step with increased speeds.

The ion exchanger installation according to the invention can be operated in down stream co-current flow mode, whereby the fluid which is to be treated as well as the liquid regeneration agent flows through the resin container from above downwards. An advantage of this type of method is that the resin bed can be back-rinsed with fresh water before the regeneration procedure, whereby a carrying out and removal of small foreign particles in particular hydrolysis products such as metal hydroxides or broken-off resin particles can be effected. However, the layering of the resin bed is thereby disrupted which subsequently requires a large expenditure of regeneration agent.

The ion exchanger installation according to the invention can also be operated in upstream counter-current flow mode. A back-rinsing against the regeneration direction is, however, not possible in this method, since the resin bed above as well as below is limited by a nozzle floor which is impervious to dirt particles.

In a preferred variation of the method the inventive ion exchanger installation is operated in downstream counter-current flow mode. Thereby it is possible to, after regenerating the ion exchange resin and before introduction of the fluid whose ions are to be exchanged in the resin of the resin container, back-rinse the resin container with fresh water in upstream mode, preferentially with increased current speeds, in particular > 20 m/h. Due to the high current speeds of the back-rinsing water smaller particles can be removed from the ion exchanger resin. However, also with this operation type, the layering of the resin bed is disrupted.

It is particularly advantageous when the regeneration of the ion exchanger resin in downstream counter-current flow mode transpires at reduced current speeds, in particular < 5 m/h. In this fashion, it is possible for the resin bed to be loosened up without disrupting the layers and therefore smaller dirt particles can be removed from the resin container. The pulsating transport stream of the compressed air-diaphragm pump utilized in accordance with the invention is, in this connection, particularly useful.

BRIEF DESCRIPTION OF THE DRAWING

The invention is described and explained in more detail below using the embodiments represented in the drawing. The features which can be extracted from the description and the drawing can be applied in other embodiments of the invention either individually or collectively in arbitrary combination.

DESCRIPTION OF THE PREFERRED EMBODIMENT

Figure 1:
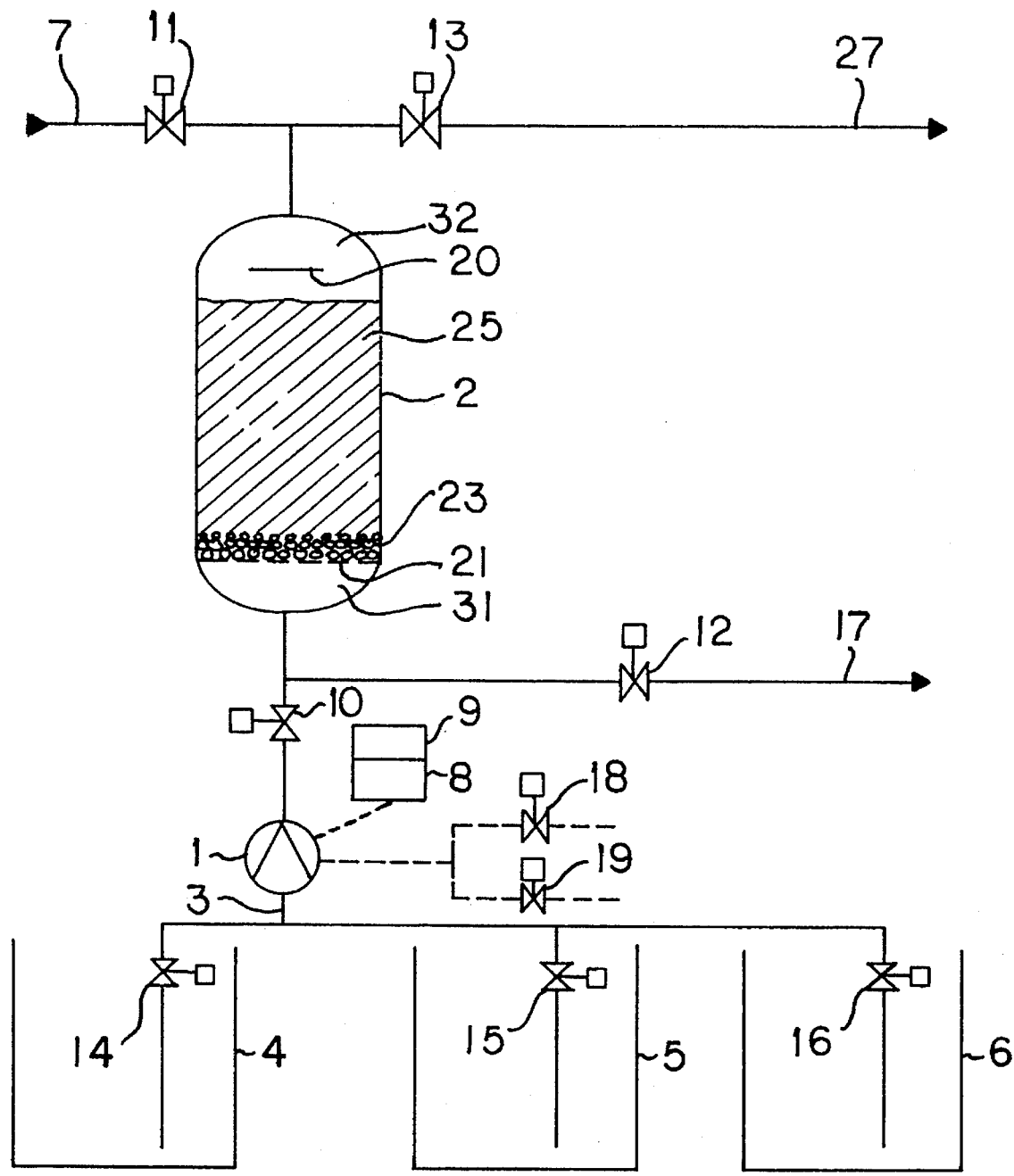
FIG. 1 shows a function schematic of the ion exchanger installation in accordance with the invention.

The heart of the ion exchanger installation shown in FIG. 1 is the resin container 2 with a lower dead space 31, a lower nozzle floor 21, a layer of coarse grained filter gravel 23 arranged thereon, a filling of ion exchanger resin 25 in the form of small resin particles deposited over the filter gravel 23 as well as a upper dead space 32, located above the resin, with a plate baffle 20.

During operation, liquid having ions in solution, usually water containing salt or lime whose unwanted ions are to be exchanged with other ions, is introduced into the resin container 2 via an inlet 7 with opened valves 11 and 12 and closed valves 10 and 13 through 16 by means of a liquid conduit which ends at the upper side of the resin container 2 in an inlet opening, the liquid being let-off at the underside of the resin container 2 into a product run-off 17. The cut-off valves 10 to 16 are each electrically controllable and can be individually activated. It is functionally advantageous when the control of the cut-off valves 10–16 transpires via a control device 9 which is schematically shown in the FIG. 1 but which, however, is not drawn in detail for reasons of clarity.

In a first operational step the resin container 2 is supplied, in the downstream mode from above towards below, with the fluid to be treated. In order to minimize stirring up the resin bed when introducing the liquid, a plate baffle 20 is provided for following the inlet opening in the upper dead space 32 in the upper side of the resin container 2. When flowing through the ion exchanger resin 25 the unwanted ions which are in solution in the liquid are exchanged with other ions on the surface of the resin particles, for example calcium ions in water which is to be softened are exchanged with sodium ions.

After a certain volume amount of liquid to be treated has flowed through the resin container 2 a large amount of unwanted ions are collected on the resin particles, and the exchange ions are exchanged therefore into the fluid to be treated. The ion exchanger resin 25 thereby becomes exhausted so that additional effective ion exchange in the fluid to be treated can no longer be guaranteed. In the case of water containing lime, this would result in an uncontrolled hardness breach in the product water streaming out of the outlet conduit 17.

In the subsequent operating step a regeneration of the exhausted ion exchanger resin 25 is carried out. In the example shown the regeneration transpires in counter-current flow mode from below towards above through the resin container 2. Towards this end the cut-off valves 11 through 13 are closed and the cut-off valve 10 is opened so that liquid regeneration agent can be pumped by a compressed air-diaphragm pump 1 from below into the resin container 2.

A counting device 8 is connected to the compressed air-diaphragm pump 1 for counting the strokes of the compressed air-diaphragm pump 1, the counting device 8 delivering a signal corresponding to the number of strokes to the control device 9 for controlling the volume flow, in the ion exchanger installation, transported through the compressed air-diaphragm pump. The counting device 8 can include an electronic counting mechanism with a plurality, in the example shown, with at least, four, storable discreet stroke values. In program execution during operation of the ion exchanger installation the counting device 8 then counts each of the strokes of the compressed air-diaphragm pump 1 up to a predetermined stroke value, and then delivers a control signal to the control device 9 which, in response thereto, introduces the subsequent operational step through switching of several of the cut-off valves 10 through 16. The counting device 8 resets itself to zero and counts up to the next discreet stored stroke value, upon which it again delivers a control signal to the control device 9 for the introduction of the subsequent operational step.

The compressed air-diaphragm pump 1 can be operated with compressed air of varying pressure either faster or slower, e.g. with larger or smaller stroke numbers per unit time. In the example shown two compressed air conduits are provided for each of which can be opened or closed via a compressed air valve 18 or 19 and which after the compressed air valve 18, 19 and before the compressed air-diaphragm pump 1 feed into a common air inlet conduit to the compressed airdiaphragm pump 1. If the compressed air-diaphragm pump 1 is fed with high pressure air, the pump then runs more quickly than when fed with air of reduced pressure. In this fashion the high speed of the compressed air-diaphragm pump 1 can be controlled.

The operational step dependent switching of the speed of the compressed air-diaphragm pump 1 can transpire automatically with the assistance of the control device 9 on the basis of the current stroke count given by the counting device 8 to the control device 9 when the compressed air valves 18, 19 are appropriately to the control device 9 in a properly controllable fashion.

The liquid regenerating agent, in contrast to the known procedure is, in the second operational step, not prepared in a preparation vessel rather is first mixed in the lower region of the resin container 2. Towards this end, initially with temporarily opened cut-off valve 14, a certain amount of water is pumped out of a water container 4 via several strokes into the lower dead space 31. Via the control device 9, the cut-off valve 14 is closed and the cut-off valve 15 is opened so that concentrated acid is transported out of an acid container 5 into the dead space 31. Subsequently one switches back to the transport of water and the alternating transport steps of water and acid are repeated a plurality of times until a predetermined amount of liquid regenerating agent is introduced into the resin container 2. The concentration of the fluid mixer is thereby determined by the corresponding stroke counts of the compressed air-diaphragm pump 1 during the transport of the individual fluids.

The lower dead space 31, the lower nozzle floor 21 and the layer of coarse grained filter gravel 23 represent an ideal mixing zone in which the introduced individual fluids can be mixed in a manner of a static mixer into a homogeneous fluid mix. The heat which is generated during the course of this mixing procedure is given off in the vicinity of the wall at the lower dead space 31 to the container wall of the resin container 2. By means of the alternating introduction of fresh water, the fluid mixture which occurs in the mixing region of the liquid regenerating agent is additionally cooled.

The alternating switching between the introduction of acid and the introduction of water transpires preferentially within short time intervals of less than 10 seconds duration.

In order to increase the dosage precision, it is also advantageous for the compressed air-diaphragm pump 1 to run, via control of the corresponding compressed air valve 18 or 19, with slower stroke speeds.

The regenerating steps described above, using diluted acid as the regenerating agent solution, are applied when the ion exchanger resin 25 is a cation exchanger. In the event of an ion exchanger resin, instead of acid from the acid container 5, concentrated alkaline solution is fed from the alkaline solution container 6 via the cut-off valve 16 together with water, to constitute the liquid regenerating agent, into the resin container 2.

In the event that the ion exchanger resin 25 is a selective exchanger in a first step the regeneration transpires with diluted acid and in a subsequent operational step a conditioning via diluted alkaline solution occurs. In this case as well, a mixing of each of the introduced fluids is effected in the mixing zone in the lower part of the resin container 2 through the alternate addition of water and corresponding concentrated fluid.

Figure 2A:
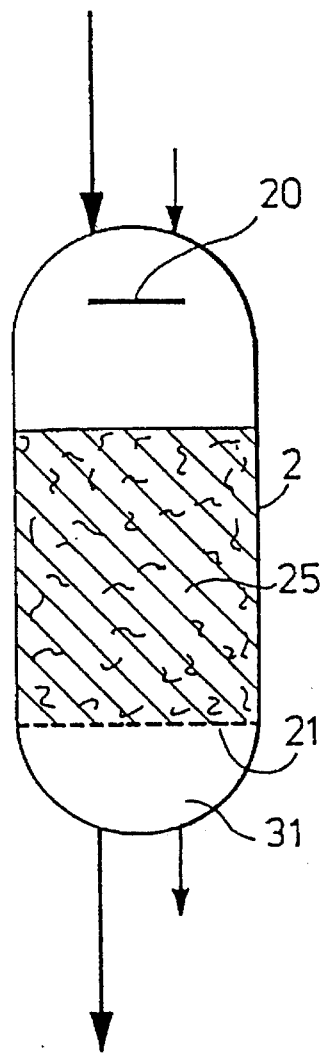
FIG. 2a shows schematic cross sections through the resin container of an ion exchanger installation in accordance with the invention in downstream co-current flow operation.
Figure 2B:
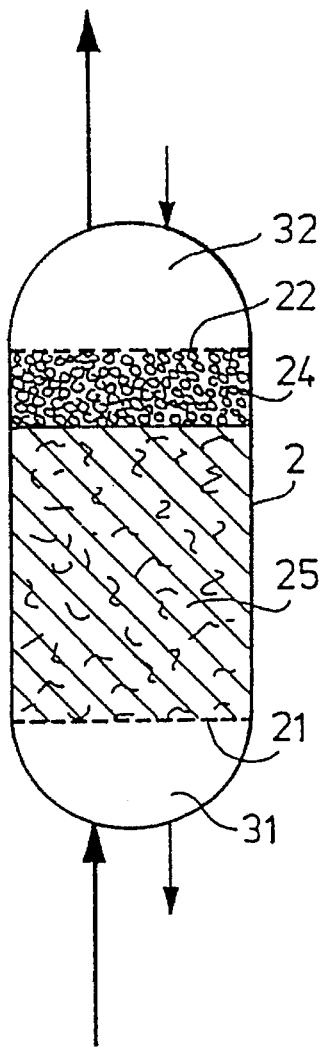
FIG. 2b shows schematic cross sections through the resin container of an ion exchanger installation in accordance with the invention in upstream counter-current flow operation.
Figure 2C:
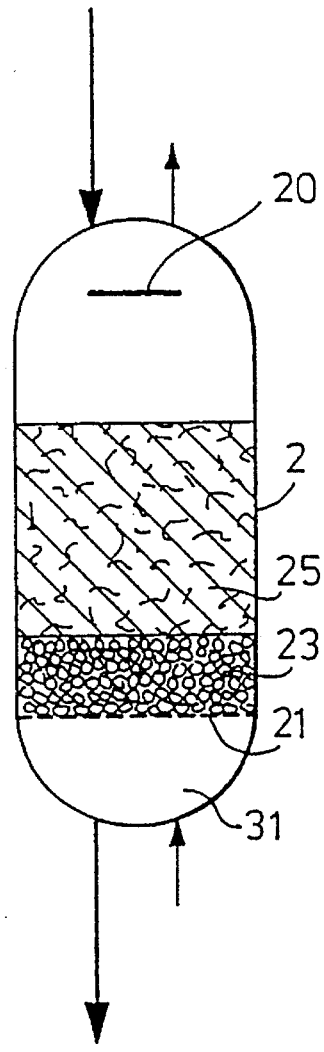
FIG. 2c shows schematic cross sections through the resign container of an ion exchanger installation in accordance with the invention in downstream counter-current flow operation.

As shown in FIGS. 2a–2c the ion exchanger installation can be operated in differing flow directions during the differing operational phases. Towards this end each large arrow indicates the flow direction of the fluid to be handled and the small arrow the flow direction of the liquid regenerating agent.

FIG. 2a shows the downstream co-current method with which both the fluids to be treated as well as the liquid regenerating agent flows through the resin container 2 from above towards below. An upper nozzle floor 22 is not necessary in this case since the ion exchanger resin 25 in the downstream co-current mode is always pushed downwards onto the lower nozzle floor 21 by the inward-streaming fluids. On the other hand the utilization of a protecting baffle 20 is recommended so that the resin bed is not directly impacted and mixed together by the introduced fluids.

FIG. 2b shows an ion exchanger installation operated in accordance with the upstream counter-current flow method. The fluid to be treated is guided hereby through the resin container 2 from below in the upwards direction when the regenerating agent fluid is introduced from above towards the bottom. In order, in this embodiment, to achieve an effective mixing zone for the mixing and homogenization of the liquid regenerating agent which as described above is produced through the alternate introduction of concentrated acid or alkaline solution and water, a cover layer of inert material 24 is provided for above the ion exchanger resin 25 and below the upper nozzle floor 22 in a form of small particles with lower specific gravity than the resin particles. During the introduction of the individual fluids for the regenerating agent solution the light inert material particles begin to swirl and thereby mix the individual fluids into a homogeneous fluid mixture.

Finally an ion exchanger installation is schematically shown in FIG. 2c) which is operated as that shown in FIG. 1 in downstream counter-current flow made. In this case, a layer of coarse grained filter gravel 23 is provided for, on the lower nozzle floor 21, which together with the dead space 31 and the lower nozzle floor 21 forms a mixing zone for the homogenization of the regenerating agent solution introduced from below towards above.

Instead of the nozzle floors 21, 22 shown in FIGS. 2a–2c commercially available fan-out nozzles can also be utilized which are comprised of slotted pipes which extend radially in a star-shaped fashion from an inlet conduit. The lower dead space 31, for the case of a downstream counter-current flow installation, is then filled with filter gravel up to the upper side of the lower fan-out nozzle.

In ion exchanger installations operated in accordance with the downstream co-current flow method (see FIG. 2a) as well as in ion exchanger installations operated according to the downstream counter-current flow method (FIG. 2c) the resin container can, prior to the regeneration step, be back-rinsed from below towards above with fresh water. During back rinsing the cut-off valves 10, 13 and 14 are opened and the remaining cut-off valves 11, 12, 15 and 16 are closed. The back-rinsing takes place in upstream mode with fresh water with increased flow velocity whereby particles of dirt having a smaller diameter than the resin particles are washed upwardly away out of the resin container and drain through the Elnat outlet 27. However, due to the forceful back-rinsing, the resin bed is also stirred up and mixed together.

The washing away effect of small dirt particles can, in the downstream counter-current flow mode, however also be achieved in that the regeneration of the ion exchanger resin 25 takes place with very low flow velocities so that the dirt particles are carried upwardly by the regeneration agent solution and are removed from the resin container 2. In this fashion the layering of the resin bed is maintained.

In contrast, in an ion exchanger installation which is operated in upstream counter-current flow mode, neither a back-rinsing step nor another type of removal of dirt particles out of the ion exchanger resin 25 in the resin container 2 is possible.

We claim:

1. An ion exchanger installation capable of regeneration having a resin container which is at least partially filled with an ion exchanger resin in the form of small resin particles, the container comprising, on each of an upper and a lower side, at least one fluid conduit ending in one of an inlet and an outlet opening for one of an introduction and a removal of fluid into and out of the resin container, the conduit comprising a water inlet, at least one inlet for at least one of an acid fluid and an alkaline solution fluid, the inlets each exhibiting a pipe conduit with a cut-off valve, the installation further comprising a pump to transport the fluids, wherein the pipe conduit inlets for fresh water and at least one of the acid fluid and the alkaline solution fluid end in a common pump feed conduit, and each inlet can be individually decoupled from the pump feed conduit by means of a controllable cut-off valve, and the pump directly transports into one of a fluid conduit ending at the upper side and at a fluid conduit ending at the lower side of the resin container, wherein the pump is a compressed air-diaphragm pump, the ion exchanger installation further comprising a counting device for stroke counting of strokes from the pump, a control device connected to the counting device for controlling, via the controllable cut-off valves and based on a stroke count of the compressed air-diaphragm pump, a volume flow of at least one of water, acid, and alkaline solution out of their respective water, acid, and alkaline solution inlets.

2. The ion exchanger installation of claim 1, wherein the stroke counting device includes a counting mechanism having at least four storable discreet stroke count values.

3. The ion exchanger installation of claim 1, wherein at least two compressed air conduits are provided for having air of differing pressures and that the compressed air-diaphragm pump comprises means for alternate driving with compressed air from one and from the other compressed air conduit.

4. The ion exchanger installation of claim 3, wherein a compressed air valve is provided for in each of the compressed air conduits, the compressed air conduits ending, after the compressed air valves and before the compressed air-diaphragm pump, in a common air inlet conduit to the compressed air-diaphragm pump.

5. The ion exchanger installation of claim 4, wherein the compressed air valves are controllable by the control device based on a current stroke count of the compressed air-diaphragm pump.

6. The ion exchanger installation of claim 1 wherein a mixing zone for the mixing and homogenization of the introduced fluids is provided for in the resin container, in the vicinity of at least one of the lower and the upper side, between the inlet opening for the introduction of at least one of the acid and the alkaline solution into the resin container and the ion exchanger resin.

7. The ion exchanger installation of claim 6 wherein the ion exchanger installation comprises means for operation in a downstream co-current flow mode.

8. The ion exchanger installation of claim 6 wherein the ion exchanger installation comprises means for operation in a downstream counter-current flow mode.

9. The ion exchanger installation of claim 8 wherein the mixing zone comprises a fan-out nozzle provided in the resin container near the lower side, and a layer of coarse grained filter gravel extending from the bottom of the resin container up to an upper side of the fan-out nozzle.

10. The ion exchanger installation of claim 6 wherein, a plate baffle is provided for in the resin container near the upper side, a nozzle floor is provided for near the lower side, and the ion exchanger resin is arranged in a volume region between the plate baffle and the lower nozzle floor, whereby a lower dead space remains between the lower nozzle floor and the lower side of the resin container.

11. The ion exchanger installation of claim 11 wherein the mixing zone consists essentially of the lower dead space, the lower nozzle floor, and a layer arranged thereon of coarse grained filter gravel.

12. The ion exchanger installation of claim 6 wherein the ion exchanger installation comprises means for operation in an upstream counter-current flow mode.

13. The ion exchanger installation of claim 12 wherein, an upper nozzle floor is provided for in the resin container, in the vicinity of the upper side, a lower nozzle floor is provided for in the vicinity of the lower side, the ion exchanger resin is arranged in a volume region between the lower and the upper nozzle floors, an upper dead space remains between the upper nozzle floor and the upper side of the resin container, and a lower dead space remains between the lower nozzle floor and the lower side of the resin container.

14. The ion exchanger installation of claim 13, wherein the mixing zone comprises the upper nozzle floor and a cover layer of inert material arranged between the upper nozzle floor and the ion exchanger resin in the form of small particles whose specific weight is less than that of the resin particles.

15. A method for the operation of an ion exchanger installation comprising, regenerating an ion exchanger resin by alternately transporting water and one of concentrated acid and alkaline solution into a resin container a plurality of times; apportioning a volume of the water, acid and alkaline solution by means of a stroke count of a compressed air-diaphragm pump; and diluting one of the introduced acid and alkaline solution to a concentration applicable for regeneration by mixing with alternately introduced water in a resin container.

16. The method of claim 15 further comprising mixing at least one of the acid and the alkaline solution with water in a mixing zone before a regenerating fluid reaches an ion exchanger resin.

17. The method of claim 15, comprising repeating an alternate introduction of water and one of the acid and the alkaline solution into the resin container in time intervals of less than 10 seconds.

18. The method of the claim 15, comprising transporting introduced fluids with velocities based on differing stroke counts per unit time of the compressed air-diaphragm pump.

19. The method of claim 15 comprising operating the ion exchanger installation in a downstream co-current flow mode.

20. The method of claim 15 comprising operating the ion exchanger installation in an upstream counter-current flow mode.

21. The method of claim 15 comprising operating the ion exchanger installation in a downstream counter-current flow mode.

22. The method of claim 21, comprising back-rinsing the resin container using upstreaming fresh water with high flow velocities, before regenerating the ion exchanger resin.

23. The method of claim 21, comprising regenerating the ion exchanger resin with reduced flow velocities of < 5 m/h.

* * * * *

UNITED STATES PATENT AND TRADEMARK OFFICE
CERTIFICATE OF CORRECTION

PATENT NO. : 5,460,724
DATED : October 24, 1995
INVENTOR(S) : Hans-Ulrich SCHWERING, et al It is certified that error appears in the above-indentified patent and that said Letters Patent is hereby corrected as shown below:

Column 11, line 33; change "claim 11" to ---claim 10---.

Signed and Sealed this

Eighteenth Day of June, 1996

Attest:

BRUCE LEHMAN

Attesting Officer          Commissioner of Patents and Trademarks